United States Patent Office 3,209,026
Patented Sept. 28, 1965

3,209,026
CYCLOHEXYLOXYCYCLOPROPYLAMINES
Jacob Finkelstein, West Englewood, and John Lee, Montclair, N.J., assignors to Hoffmann-La Roche Inc., Nutley, N.J., a corporation of New Jersey
No Drawing. Filed Mar. 29, 1963, Ser. No. 269,138
3 Claims. (Cl. 260—563)

This invention relates to novel compounds, novel intermediates therefor and processes for preparing them. The novel compounds to which this invention relates are cyclohexyloxycyclopropylamines and the corresponding analogous cyclohexylthiocyclopropylamines. These compounds are basic and form acid addition salts which are also included in the invention.

More particularly, the novel compounds of the invention are bases of the formula (I) 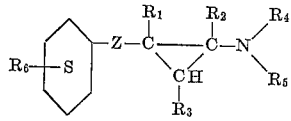

wherein $R_1$, $R_2$, $R_3$, $R_4$ and $R_5$ are each selected from the group consisting of hydrogen and lower alkyl; $R_6$ is selected from the group consisting of hydrogen and lower alkyl; and Z is selected from the group consisting of oxygen, sulfur and oxy-lower alkyl, and acid addition salts thereof with pharmaceutically acceptable salts. In a preferred embodiment, one of $R_1$, $R_2$ or $R_3$ is lower alkyl and the remainder of $R_1$, $R_2$ and $R_3$ are hydrogen. In a more preferred embodiment, $R_1$, $R_2$ and $R_3$ are all hydrogen. Thus, in the preferred embodiment, one of $R_1$, $R_2$ and $R_3$ is selected from the group consisting of hydrogen and lower alkyl and the remainder of $R_1$, $R_2$ and $R_3$ is hydrogen.

The term alkyl as used in this disclosure includes straight and branched chain hydrocarbon groups such as the methyl group. The term oxy-lower alkyl, as used in the instant disclosure, is intended to connote groups which contain an oxygen atom and which are joined to the cyclohexyl moiety through the said oxygen atom.

The compounds of Formula I are, as stated above, basic, and form salts with acids. They form acid addition salts with pharmaceutically acceptable acids such as inorganic acids, e.g. hydrochloric, hydrobromic, sulfuric, phosphoric and the like, and organic acids such as maleic, succinic, glutaric, tartaric, citric, formic, acetic, toluene sulfonic and the like.

The compounds of Formula I above are valuable medicinal agents. They can be administered internally, for example, orally or parenterally, and can be administered in conventional pharmaceutical dosage forms such as capsules, solutions, suspensions, tablets and the like with or without excipients. These compounds are monoamine oxidase inhibitors, that is, they inhibit the activity of monoamine oxidase. They are useful in psychotherapy for relief of disturbed or depressed states.

The novel compounds of this invention of Formula I above can be prepared by several different courses of procedure. These different reaction routes use compounds of the formula (II) 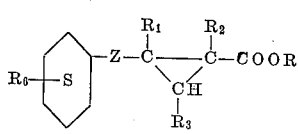

wherein $R_1$, $R_2$, $R_3$, $R_6$ and Z have the same meanings as in Formula I above and R is selected from the group consisting of hydrogen and lower alkyl. The cyclohexyl ring encircling the character S is unsubstituted or contains a lower alkyl substituent and thus, as is apparent from the above, all the R's, which may be the same or different, are hydrogen or lower alkyl, e.g. 2-cyclohexyloxycyclopropyl, 2-cyclohexylthiocyclopropyl or 2-(cyclohexyloxymethyl)cyclopropyl carboxylates and lower alkyl derivatives thereof, as the starting material.

The 2-cyclohexyloxycyclopropyl, the 2-cyclohexylthiocyclopropyl and the 2-(cyclohexyloxymethyl)cyclopropyl carboxylates are prepared, respectively, via the reaction of a cyclohexyl vinyl ether, a cyclohexyl vinyl thio ether and a cyclohexylallyl ether with an α-diazo ester such as a lower alkyl ester of an α-diazo-lower alkanoic acid, for example, ethyl diazoacetate or the like. Advantageously, this reaction is conducted in the presence of a catalyst such as copper powder, though such is not critical. Ethers suitable for use in the above preparation are represented by the cyclohexylvinyl ether, cyclohexylallyl ether and cyclohexylvinyl thio ether.

Two of the reaction routes of the invention involve reacting carboxylates such as 2-cyclohexyloxycyclopropyl, 2-cyclohexylthiocyclopropyl or 2-(cyclohexyloxymethyl)-cyclopropyl carboxylate with hydrazine. This reaction produces, respectively, 2-cyclohexyloxycyclopropyl carboxylic acid hydrazide, 2-cyclohexylthiocyclopropyl carboxylic acid hydrazide or a 2-(cyclohexyloxymethyl)cyclopropyl carboxylic acid hydrazide. Thus, for example, 2-cyclohexyloxycyclopropyl carboxylic acid ethyl ester can be reacted with hydrazine to yield 2-cyclohexyloxycyclopropyl carboxylic acid hydrazide.

The 2-cyclohexyloxycyclopropyl carboxylic acid hydrazide or the 2-cyclohexylthiocyclopropyl carboxylic acid hydrazide so obtained which would correspond to the formula (III) 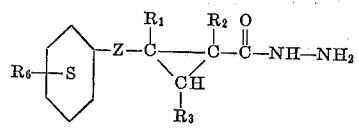

wherein $R_1$, $R_2$, $R_3$, $R_6$ and Z have the same meaning as in Formula II above, can then be subjected to nitrous acid to yield the corresponding azide of the formula (IV) 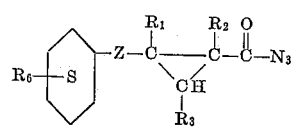

wherein $R_1$, $R_2$, $R_3$, $R_6$ and Z have the same meaning as in Formula III above.

wherein $R_1$, $R_2$, $R_3$, $R_6$ and Z have the same meaning as gen with rearrangement to the corresponding isocyanate with the formula (V) 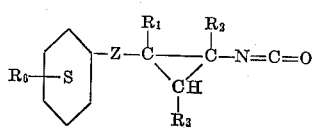

wherein $R_1$, $R_2$, $R_3$, $R_6$ and Z have the same meaning as in Formula III above.

Another way of preparing the isocyanates of Formula V above from the 2-cyclohexyloxycyclopropyl carboxylic acid hydrazides, 2-cyclohexylthiocyclopropyl carboxylic acid hydrazides, etc. of Formula III above is by hydrogenolysis of the compounds of Formula III to the corresponding amides of the formula (VI) 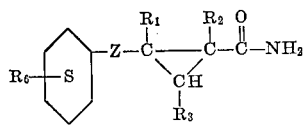

wherein $R_1$, $R_2$, $R_3$, $R_6$ and Z have the same meaning as in Formula III above, which can then be subjected to the action of halogen and alkali to yield the isocyanates of Formula V above. The hydrogenolysis referred to above can be conducted using conventional hydrogenating agents. One preferred embodiment involves hydrogenation in the presence of Raney nickel. The halogen used in the reaction of the amide to the isocyanate is preferably chlorine or bromine and the alkali used is any conveniently available alkali such as alkali metal hydroxide, e.g. sodium hydroxide.

Besides proceeding through the hydrazides of Formula III above, there is yet another method by which the isocyanates of Formula V above can be prepared from the 2-cyclohexyloxycyclopropyl, 2-cyclohexylthiocyclopropyl carboxylates, etc. of Formula II above. This method comprises reacting a compound corresponding to Formula II above with hydroxylamine to form, for example, 2-cyclohexyloxycyclopropyl hydroxamic acid or a 2-cyclohexylthiocyclopropyl hydroxamic acid of the formula (VII) 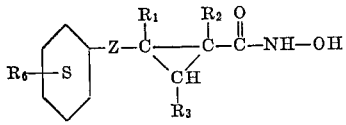

wherein $R_1$, $R_2$, $R_3$, $R_6$ and Z have the same meaning as in Formula I above, which can then be subjected to the action of a suitable dehydrating agent such as thionyl chloride to yield the corresponding isocyanates of Formula V above.

Yet another procedure for forming the isocyanates of Formula V above involves treating the 2-cyclohexylcyclopropyl or 2-cyclohexylthiocyclopropyl carboxylates or derivatives thereof with a hydrolyzing agent whereby to form the corresponding 2-cyclohexyloxycyclopropyl carboxylic acid or the thio analogue thereof. The hydrolysis can be conveniently effected by employing an alkali. Representative of alkalis especially suitable for the present purpose are alkali metal hydroxides such as sodium hydroxide. However, the alkali used can be any conveniently available alkali. The 2-cyclohexyloxycyclopropyl carboxylic acid or thio analogue thereof is reacted with a lower alkyl ester of chloroformic acid whereby to form the 2-cyclohexyloxycyclopropyl carboxylic acid-lower alkyl oxy-lower alkanoic anhydride or the analogue thereof corresponding to the formula (VIII) 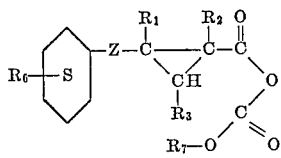

wherein $R_1$, $R_2$, $R_3$, $R_6$ and Z have the meanings ascribed thereto hereinabove, and $R_7$ is lower alkyl.

The 2-cyclohexyloxycyclopropyl carboxylic acid-lower alkyl oxy-lower alkanoic anhydride or its thio analogue is reacted with sodium azide to form an azide corresponding to Formula IV above. The azide, as set out hereinabove, upon heating in an inert solvent, loses nitrogen with rearrangement to the corresponding isocyanate of the Formula V above. Similarly, a 2-(cyclohexyloxymethyl)cyclopropyl carboxylate can be reacted with hydroxylamine to form compounds of the Formula VII, which compounds can thereafter be converted to an isocyanate of the Formula V by the method outlined above.

In a particular embodiment, the ethyl ester of 2-cyclohexyloxycyclopropyl carboxylate is reacted with alkali to form the corresponding acid. The acid is reacted with ethyl chloroformate to form 2-cyclohexyloxycyclopropyl carboxylic acid ethoxy formic anhydride. The anhydride is then reacted with sodium azide to form the corresponding azide. This azide is rearranged in situ to form the isocyanate (V) in the manner set out above, which isocyanate in the presence of absolute ethanol forms the urethane corresponding thereto. The urethane is hydrolyzed with a basic substance such as sodium hydroxide to form the desired 2-cyclohexyloxycyclopropylamine.

The isocyanates obtained according to the different courses of procedure outlined above can be converted to the corresponding 2-cyclohexyloxycyclopropylamines and the 2-cyclohexylthiocyclopropylamines of the invention corresponding to Formula I above, for example, by direct hydrolysis. This hydrolysis can be conducted by conventional means, e.g. acidic or alkaline hydrolysis.

Another manner of obtaining the end product corresponding to Formula I above wherein $R_1$, $R_2$ and $R_3$ are hydrogen, from the isocyanates corresponding to Formula V above, is to react an isocyanate with an alcohol such as lower alkanol to form a carbamic acid ester of the formula (IX) 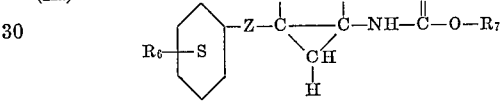

wherein Z, $R_6$ and $R_7$ have the meanings ascribed thereto hereinabove, which can then be hydrolyzed to the corresponding 2-cyclohexyloxycyclopropylamine or 2-cyclohexylthiocyclopropylamine of Formula I above.

The hydrolysis of the compound of the Formula IX and of the isocyanate can be conducted employing conventional methods, e.g. acid or alkaline hydrolysis. For example, the hydrolysis can be conducted utilizing barium hydroxide in alcohol, concentrated hydrochloric acid, dilute hydrochloric acid with or without acetic acid, sodium hydroxide and the like.

The lower alkyl derivatives of the cyclopropylamines of the types specified hereinabove can be prepared by conventional techniques. For example, the monomethyl derivatives of the said cyclopropylamines can be prepared by refluxing the same in the presence of ethyl formate and, thereafter, treating the resultant product with methyl iodide. The dimethyl derivatives can be obtained, for example, by methylation of the primary amine employing formalin.

The foregoing is a general description of the main synthetic routes in the preparation of cyclohexyloxycyclopropylamines and the analogues thereof. It will be readily apparent to one skilled in the art that variations of these procedures are possible. Of particular advantage as preparative procedures are the methods thoroughly discussed above, particularly the method which involves the reaction of the cyclohexylether and the diazo acid ester and the subsequent conversion of the reaction product of this reaction sequentially to a formic anhydride, an azide, and then to an isocyanate.

The following examples are illustrative but not limitative of the compounds of this invention and the procedures for their preparation.

*Example 1*

To 310 g. of cyclohexylvinyl ether in 320 ml. of dry xylene and 3 g. of copper powder, there was slowly added, while maintaining the temperature at 120°, a solution of 400 g. of ethyl diazoacetate in 400 ml. of dry xylene. After such addition, the reaction was completed by refluxing for three hours. The reaction mixture was filtered after the cooling thereof, concentrated in vacuo from a water bath, and then the residual oil was distilled. Ethyl-2-cyclohexyloxycyclopropyl carboxylate was collected between 100 and 108° at 3 mm.

Example 2

A mixture of 21.2 g. of ethyl 2-cyclohexyloxycyclopropyl carboxylate, 8 g. of sodium hydroxide dissolved in 10 ml. of water and 50 ml. of ethanol were refluxed for three hours. The solvent was evaporated in vacuo. The solid residue remaining from such evaporation was dissolved in 100 ml. of water and the solution made acidic with 6 N HCl to yield an oily precipitate which crystallized on scratching. The acid was filtered off. The resulting 2-cyclohexyloxycyclopropyl carboxylic acid was washed with a little water and recrystallized from 40 percent ethanol. It had a melting point of 79–81°.

Example 3

To a stirred solution of 60 g. of 2-cyclohexyloxycyclopropyl carboxylic acid in 150 ml. of acetone and 75 ml. of water, there was added, at a temperature of −5°, a solution of 40.5 g. of triethylamine in 300 ml. of acetone. The mixture was stirred for a short time. A solution of 43.5 g. of ethyl chloroformate in 100 ml. of acetone was then added and the stirring at −5° was repeated for 30 minutes thereby preparing 2-cyclohexyloxycyclopropyl carboxylic acid ethoxy formic anhydride. Thereafter, a solution of 32.5 g. of sodium azide in 200 ml. of water was added and the stirring continued for an additional two hours between −5° and 0°, thereby forming the corresponding azide. The reaction mixture was poured into an ice-cold saturated solution of sodium chloride and extracted three times with 400 ml. portions of ether. The ethereal solutions were dried over magnesium sulfate and filtered. 1 l. of absolute ethanol was added to the ether extracts and warmed on a steam bath to distill off the ether. The resulting solution was refluxed for six hours thereby preparing 2-cyclohexyloxycyclopropane isocyanate. The solvent was then removed in vacuo from a water bath. The residue remaining was treated with 300 ml. of 40 percent aqueous sodium hydroxide solution and refluxed for 36 hours. The solution was cooled and extracted with ether. The ethereal extract was washed with water, dried, filtered with ether, evaporated, and the residual oil distilled. The resulting 2-cyclohexyloxycyclopropylamine boiled at 50–60° at 1 mm.

2-cyclohexyloxycyclopropylamine was converted into the hydrochloride thereof by saturating an ether solution containing the said amine with hydrogen chloride. 2-cyclohexyloxycyclopropylamine hydrochloride was obtained as a pure white crystalline compound after recrystallizing from a mixture of ethanol-ethyl acetate and was found to have a melting point of 174–176°.

Example 4

7.8 g. of cyclohexyloxycyclopropylamine and 9.0 g. of 37 percent formalin were dissolved in 250 ml. of methanol. Raney nickel was added to the resulting solution and the solution was then shaken under 50 pounds pressure of hydrogen until a drop in pressure was observed. The spent catalyst was filtered off and the filtrate concentrated in vacuo. The residual oil was diluted with water and extracted with ether. After filtering and evaporating the solvent, the residual liquid was distilled. 1-dimethyl-amino-2-cyclohexyloxycyclopropane boiled at 48–53° at approximately 1 mm.

1-dimethylamino - 2 - cyclohexyloxycyclopropane was converted into the hydrochloride thereof by saturating an ether solution of the amine with dry hydrogen chloride. 1-dimethylamino - 2 - cyclohexyloxycyclopropane hydrochloride was obtained as a crystalline compound after recrystallization from a mixture of ethanol-ethyl acetate. The crystalline material was found to have a melting point of 187–189°.

Example 5

A solution of 66 g. of 2-cyclohexyloxycyclopropyl carboxylic acid ethyl ester in 150 ml. of ethanol and 157 ml. of 85 percent hydrazine hydrate was refluxed for 24 hours, and then concentrated in vacuo from a warm water bath to a yellowish syrup. After the addition of water the product was extracted with ether. The ethereal extract was dried, filtered, concentrated to obtain the 2-cyclohexyloxycyclopropyl carboxylic acid hydrazide as a very viscous distillable oil, boiling at 150–153° at 1 mm.

Example 6

A solution of 10 g. of 2-cyclohexyloxycyclopropyl carboxylic acid hydrazide in 500 ml. of 97 percent ethanol was stirred and refluxed with 80 g. of Raney nickel for three hours. The solution was filtered and concentrated in vacuo to obtain an oily residue. The 2-cyclohexyloxycyclopropyl carboxylic acid amide was crystallized from carbon tetrachloride and melted at 101–104°.

Example 7

3½ g. of hydroxylamine hydrochloride was added to a solution of 2.5 g. of sodium in 80 ml. of absolute ethanol. The sodium chloride that precipitated was filtered off and the filtrate added to 10.6 g. of 2-cyclohexyloxycyclopropyl carboxylic acid ethyl ester and refluxed for two hours. The reaction mixture was diluted with 50 ml. of water and acidified to pH 3.2 with 3 N-HCl. The 2 - cyclohexyloxycyclopropyl hydroxamic acid was extracted with ether from which it was isolated as an oil.

Example 8

A mixture of 15.5 g. of cyclohexyloxycyclopropylamine and 65 ml. of ethyl formate was refluxed for 20 hours and the excess ethyl formate removed in vacuo. The residual liquid crystallized on cooling, yielding N-(2-cyclohexyloxycyclopropyl)formamide.

Under nitrogen, 18.3 g. of N-(2-cyclohexyloxycyclopropyl)formamide in 500 ml. of tetrahydrofuran was reacted with 2.4 g. of sodium hydride. The reaction product was refluxed for 1 hour, then 75 g. of methyl iodide was added and refluxed overnight. The excess reagent and solvent were removed in vacuo and the crude product refluxed with 250 ml. of 6N-HCl overnight. The solution was concentrated in vacuo, under nitrogen, and the residue dried with water. The aqueous solution was made alkaline with 4N-NaOH and extracted with ether, yielding 1- methylamino-2-cyclohexyloxycyclopropane.

We claim:

1. A compound selected from the group consisting of compounds of the formula

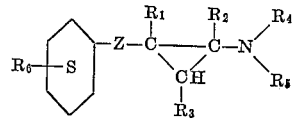

and the pharmaceutically acceptable salts thereof wherein one of $R_1$, $R_2$ and $R_3$ is selected from the group consisting of lower alkyl and hydrogen and the remainder of $R_1$, $R_2$ and $R_3$ are hydrogen; $R_4$, $R_5$ and $R_6$ are each selected from the group consisting of hydrogen and lower alkyl and Z is selected from the group consisting of oxygen and sulfur.

2. 2-cyclohexyloxycyclopropylamine.
3. 1-dimethylamino-2-cyclohexyloxycyclopropane.

References Cited by the Examiner

UNITED STATES PATENTS

| | | | |
|---|---|---|---|
| 3,014,966 | 12/61 | Freifelder et al. | 260—570.8 XR |
| 3,059,020 | 10/62 | Kaiser et al. | 260—349 |
| 3,079,403 | 2/63 | Weinstock | 260—349 |

CHARLES B. PARKER, Primary Examiner.

UNITED STATES PATENT OFFICE
CERTIFICATE OF CORRECTION

Patent No. 3,209,026  September 28, 1965

Jacob Finkelstein et al.

It is hereby certified that error appears in the above numbered patent requiring correction and that the said Letters Patent should read a corrected below.

Column 2, line 55, for "above." read -- above, --; line 57, strike out "wherein $R_1$, $R_2$, $R_3$, $R_6$ and Z have the same meaning as" and insert instead -- which then, upon heating in an inert solvent, loses nitro- --.

Signed and sealed this 31st day of May 1966.

(SEAL)
Attest:

ERNEST W. SWIDER
Attesting Officer

EDWARD J. BRENNE
Commissioner of Patent